Nov. 21, 1972     H. HÖLLER ET AL     3,703,590

APPARATUS FOR THE PRODUCTION OF SYNTHETIC PLASTIC BAGS

Filed June 21, 1971     2 Sheets-Sheet 1

INVENTORS
HANS HÖLLER
JOSEF BREIDENBACH
ALOYS MILLES
BY

United States Patent Office 3,703,590
Patented Nov. 21, 1972

3,703,590
APPARATUS FOR THE PRODUCTION OF
SYNTHETIC PLASTIC BAGS
Hans Holler and Josef Breidenbach, Bergisch Gladbach, and Aloys Milles, Leichlingen, Germany, assignors to Gebruder Heller G.m.b.H., Bergisch Gladbach, Germany
Filed June 21, 1971, Ser. No. 154,957
Claims priority, application Germany, June 22, 1970, P 20 30 599.1
Int. Cl. B30b 15/34
U.S. Cl. 156—583
15 Claims

ABSTRACT OF THE DISCLOSURE

Apparatus for the production of bags having overlapping layers of bondable synthetic plastic material has an annulus of first sealing members which are rotated by a carrier about a vertical axis and a set of second sealing members mounted on a platform which is oscillatable back and forth about the axis and moves for a certain interval at the exact speed of the first carrier while the carrier and the platform rotate in the same direction to thereby maintain each second sealing member in alignment with the adjoining first sealing member. A blank having overlapping bondable layers is advanced between the first and second sealing members at the exact speed of and in the same direction as the first sealing members, and the platform support pneumatic cylinders which press the second sealing members toward the adjacent first sealing members while the platform rotates in the same direction and at the speed of the carrier whereby the cooperating first and second sealing members compress selected portions of the blank therebetween to provide such portions with seams. The blank is thereupon severed midway across each seam to yield a succession of discrete bags each of which is open at one or both ends, depending on the nature of the blank. The first sealing members alternate with rod-shaped guide members which engage the blank and are movable radially of the carrier to change the length of the path for the blank. The first sealing members can be retracted away from the path for the blank to prevent charring when the apparatus is idle.

BACKGROUND OF THE INVENTION

The present invention relates to apparatus for the manufacture of envelopes or bags, and more particularly to improvements in apparatus for the automatic production of bags which consist of or comprise layers of weldable, bondable or heat-sealable synthetic plastic material. Still more particularly, the invention relates to improvements in apparatus for the making of spaced welded or bonded seams on overlapping sheets consisting of or incorporating layers or foils of weldable synthetic plastic material.

Pat. No. 3,004,881 discloses a bag making apparatus wherein a set of sealing members travels along an endless path and which further comprises an endless chain carrying a set of pressing members. The chain is mounted in such a way that a portion thereof travels along an arcuate semicircular path surrounding one-half of the endless path for the sealing members. The pressing members which travel with the arcuate portion of the chain are biased by the latter against the adjoining sealing members to provide spaced parallel seams on a blank consisting of overlapping layers of weldable material and traveling between the adjoining pressing and sealing members. Since the force with which the pressing members bear against the adjacent sealing member is determined exclusively by the tensioning of the chain, such apparatus cannot always generate pressures which are desirable or necessary for the formation of satisfactory seams. Furthermore, since the length of the chain increases in response to prolonged tensioning, the pressing members are likely to be moved out of exact alignment with the neighboring sealing members to thus affect the quality of seams.

German Pat. No. 1,124,865 discloses a modified apparatus wherein the function of pressing members is taken over by an endless belt which is adjacent to the endless path for the sealing members and extends along an arc of approximately 90 degrees. The pressure which the belt can generate is even less than the pressure of pressing members which are mounted on a chain; therefore, the apparatus of this German patent employs a backup member which rolls along the outer side of the belt in the region where the belt bears against the blank of weldable material. The intervals during which the backup member causes the belt to exert a relatively high pressure against the adjoining sealing member are extremely short and are often insufficient to insure the formation of satisfactory seams. Furthermore, such apparatus are not suited for the formation of undulate or other relatively complicated seams.

SUMMARY OF THE INVENTION

An object of the invention is to provide a bag making apparatus wherein the means which biases a blank consisting of or including overlapping layers of weldable material against the sealing members can exert a desirable force to thus insure the formation of clearly defined and highly satisfactory simple or complicated seams.

Another object of the invention is to provide an apparatus wherein the bags can be produced at a high speed, wherein the movements of sealing members can be readily, accurately and conveniently synchronized with movements of means which presses the blank against the sealing members, and which can be rapidly converted for the making of relatively wide or relatively narrow bags.

A further object of the invention is to provide the bag making apparatus with novel and improved means for preventing charring or other damage to a blank when the apparatus is at a standstill or operates at less than normal speed.

An additional object of the invention is to provide novel and improved pressing members for use in the above-outlined apparatus to apply pressure against those portions of a blank which abut against one or more sealing members.

Still another object of the invention is to provide a compact bag making apparatus which is capable of producing undulate or other complicated seams with the same degree of precision as plain or straight seams and which can be used for the production of bags or analogous containers from a variety of weldable, heat-sealable or pressure-responsive materials.

The improved bag making apparatus comprises first carrier means which is rotatable about a predetermined axis (preferably in a single direction about a vertical axis), a plurality of equidistant first sealing members mounted on the first carrier means for orbital movement about the axis of the carrier means, second carrier means mounted for angular movement about the axis of the first carrier means, preferably in such a way that it is caused to alternately rotate clockwise and counterclockwise through angles of predetermined magnitude, a plurality of second sealing members mounted on the second carrier means, means for advancing a blank having overlapping layers of weldable or bondable material along a predetermined path extending between the first and second sealing members and in such a way that the speed of forward movement of the blank equals the speed of orbital movement of the first sealing members, and means for moving the second sealing members toward the adjacent first sealing members while the first and second carrier means rotate in the same direction and at identical speeds to thereby compress the blank between the cooperating first and second sealing members with attendant bonding of compressed portions of bondable layers to each other. Such bonding can take place in response to the application of heat and/or pressure; to this end, the first and/or the second sealing members can be provided with heating means. The means for moving the second sealing members toward the adjacent first sealing members preferably comprises discrete fluid-operated cylinders which are mounted on the second carrier means.

The novel features which are considered as characteristic of the invention are set forth in particular in the appended claims. The improved bag making apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
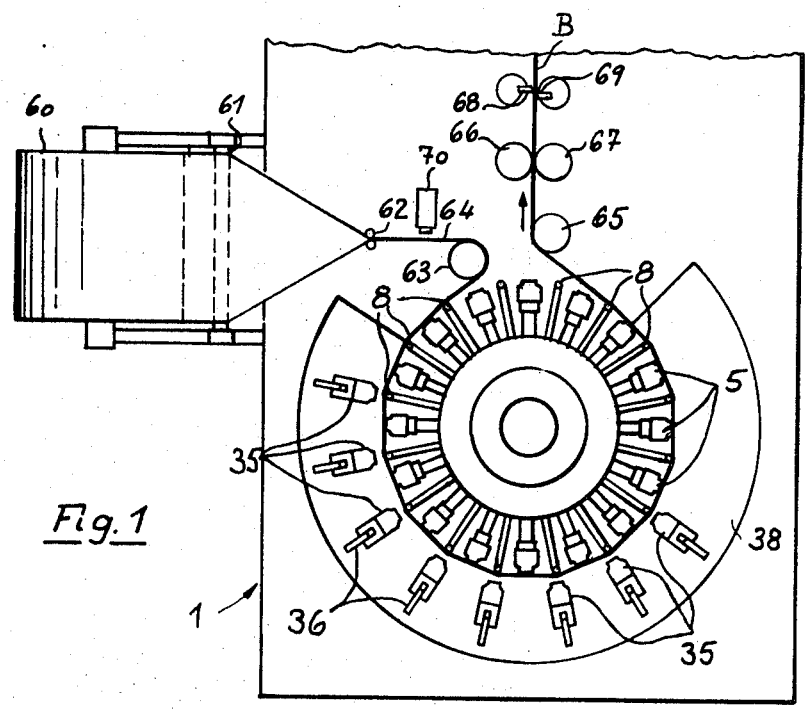
FIG. 1 is a diagrammatic plan view of a bag making apparatus which embodies one form of the invention, with the second sealing members shown in one of their end positions.
Figure 2:
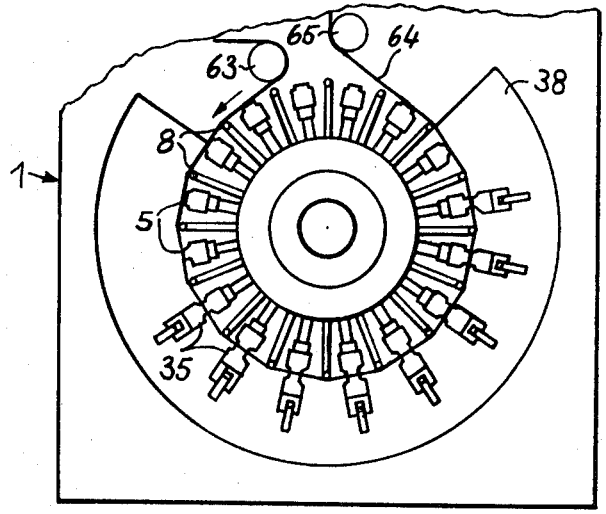
FIG. 2 illustrates a portion of the structure shown in FIG. 2, with the second sealing members shown in engagement with a blank.
Figure 3:
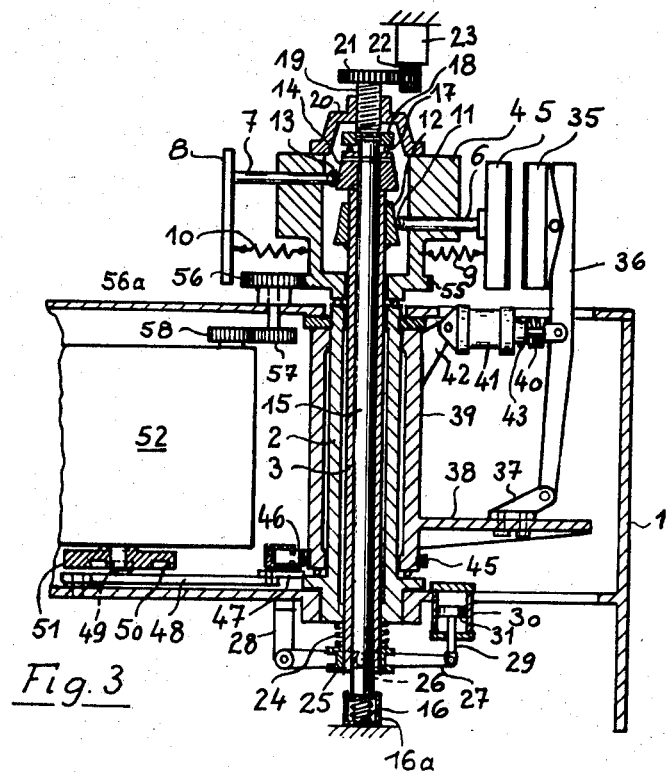
FIG. 3 is a central vertical sectional view of the apparatus.

Referring first to FIGS. 1 to 3, there is shown a bag making apparatus which comprises a frame 1 mounting an upright hollow supporting column 2. The column 2 surrounds a rotatable and axially movable tube 3. The latter comprises an upper end portion extending beyond the column 2 and connected with a hollow drum-shaped carrier 4 which is rotatable with respect thereto. The carrier 4 supports thirty-two radially extending shafts 6 and 7 which form two groups of sixteen equidistant shafts each disposed in two horizontal planes located at different levels. As shown in FIG. 3, the common plane of the axes of shafts 6 is located at a level below the plane of the common axes of shafts 7. The shafts 6 and 7 are movable axially in the radial direction of the carrier 4. The outer end portions of the shafts 6 carry first upright welding or sealing members 5 which are equidistant from each other and are biased radially inwardly (together with the shafts 6) by helical springs 9. The sealing members 5 have outwardly facing welding or sealing electrodes. The outer end portions of the upper shafts 7 carry rod-shaped guide members 8 which are parallel with the common axis of the column 2 and tube 3 and are biased radially inwardly (together with their shafts 7) by helical springs 10. The inner end portions of the springs 9, 10 are attached to the carrier 4 and the guide members 8 alternate with the sealing members 5, i.e., each first sealing member 5 is flanked by two equidistant guide members 8 and vice versa (see FIGS. 1 and 2).

The inner end portions of the shafts 6 are provided with roller followers 11 which engage a frustoconical adjusting cam 12 secured to the tube 3 in the interior of the carrier 4. The inner end portions of the shafts 7 have roller followers 13 which are biased by springs 10 against the external surface of a second frustoconical adjusting cam 14 also mounted in the interior of the carrier 4 at a level above the cam 12. The external surfaces of the adjusting cams 12 and 14 taper upwardly, as viewed in FIG. 3, and the cam 14 is affixed to the upper end portion of a vertical spindle 15 which is coaxial with the hollow column 2. The base of the cam 14 rests on the top end face of the tube 3. The spindle 15 is axially movable in the tube 3 and its lower end face rests on a helical spring 16 mounted in a tube 3 and its lower end face rests on a helical spring 16 mounted in a confining ring 16a. The spring 16 biases the spindle 15 axially upwardly so that a thrust bearing 17 at the upper end of the spindle abuts against a plate-like stop 18. The stop 18 is mounted at the lower end of a feed screw 19 which meshes with a stationary bell-shaped nut 20 located at a level above the carrier 4. The upper end portion of the feed screw 19 extends beyond the nut 20 and carries a gear 21 which meshes with a pinion or gear 22 mounted at the lower end of the output shaft of an adjusting motor 23, e.g., a reversible electric motor. When the motor 23 is started to rotate the pinion 22 in a clockwise or in a counterclockwise direction, the feed screw 19 moves up or down and lifts or lowers the stop 18 for the spindle 15 which latter is biased upwardly by the spring 16. The spindle 15 raises or lowers the upper adjusting cam 14 with the result that the guide members 8 are moved radially outwardly under the action of springs 10 or radially inwardly against the opposition of the springs 10.

The lower end portion of the tube 3 carries a pulley-shaped motion transmitting member 25 having a circumferential groove and being biased axially downwardly by a helical spring 24 which surrounds the tube 3 and reacts against the lower end face of the column 2. The circumferential groove of the motion transmitting member 25 receives a roller 26 provided on an intermediate portion of a one-armed lever 27 one end of which is fulcrumed on a downwardly extending bracket 28 of the frame 1 and the other end of which is articulately connected with the piston rod 29 of a piston 31 which is reciprocable in a double-acting hydraulic or pneumatic cylinder 30 fixed to the frame 1. The cylinder 30 is assumed to be a pneumatic cylinder and its lower chamber is filled with a compressed gas (e.g., air) when the apparatun is in use so that the lever 27 tends to pivot in a counterclockwise direction, as viewed in FIG. 3, and causes the motion transmitting member 25 to urge the upper end face of the tube 3 against the base of the adjusting cam 14 on the spindle 15. Since the lower adjusting cam 12 is fixed to the tube 3 and the latter normally bears against the base of the cam 14, the axial position of the cam 12 is a function of the axial position of spindle 15, cam 14 and feed screw 19. This means that each and every adjustment of the shafts 7 for the guide members 8 entails a proportional axial adjustment of the shafts 6 for the sealing members 5. The basic or normal positions of the adjusting cams 12, 14 and hence of the sealing members 5 and guide members 8 are such that the axes of the guide members 8 are located at the corners of a regular polygon having sixteen sides and that the electrodes of the sealing members 5 are located midway between the two neighboring corners of the polygon (see FIGS. 1 and 2). The length of each side of the polygon i.e., the distance between two neighboring sealing members 5) equals the width of bags which are to be produced in the apparatus.

The sealing members 5 cooperate with eigh equidistant second sealing or pressing members 35 which are outwardly adjacent to the circle formed by the sealing members 5 and extend along an arc having its center of curvature on the axis of the spindle 15. The pressing or sealing members 35 are mounted at the upper ends of one-armed levers 36 which are located in vertical planes and the lower end portions of which are pivotably connected to brackets 37 on the platform 38 of a second carrier. The brackets 37 are adjustable in the radial direction of the platform 38 and the latter is secured to or integral with the lower end portion of a bearing sleeve 39 which rotatably surrounds the column 2 and also forms part of the second carrier. The pressing members 35 are pivotable with reference to the respective levers 36 about horizontal axes and the levers 36 are pivotable with reference to their brackets 37 about axes which are parallel to the pivot axes for the respective pressing members 35. The median portions of the levers 36 are articulately connected with the piston rods 40 of pistons (not shown) which are reciprocable in hydraulic or pneumatic cylinders 41. Each cylinder 41 is articulately connected with a discrete bracket 42 of the bearing sleeve 42 and each piston rod 40 is surrounded by a helical spring 43 which reacts against the respective cylinder 41 and biases the corresponding lever 36 in a direction to move the associated pressing member 35 radially outwardly, i.e., away from the annulus of sealing members 5. The cylinders 41 are assumed to be pneumatic cylinders and serve to move the pressing members 35 radially inwardly into engagement with a folded blank 64 of synthetic plastic material which is guided by the members 8 and extends between the pressing members 35 and the sealing members 5. Such radially inwardly oriented movements of the pressing members 35 take place in response to admission of a compressed gas into the other chambers of the cylinders 41, i.e., into those chambers which are adjacent to the respective springs 43.

The bearing sleeve 39 is oscillatable or turnable back and forth about the column 2 through angles of predetermined magnitude. The oscillating means for the bearing sleeve 39 and hence for the levers 36, cylinders 41 and pressing members 35 comprises a ring gear 45 which is provided on or secured to the bearing sleeve 39 at a level below the platform 38, a reciprocable toothed rack 46 which meshes with the ring gear 45, and a device for reciprocating the rack 46. Such reciprocating device includes a link 47 which couples the rack 46 with a lever 48 one end of which is secured to the frame 1 for pivotal movement about a vertical axis. An intermediate portion of the lever 48 carries a roller follower 49 which extends into the endless groove 50 at the underside of a disk-shaped cam 51 mounted on the downwardly extending output shaft of a transmission 52. The transmission 52 is mounted in or on the frame 1; when the cam 51 rotates, its groove 50 causes the lever 48 to pivot with reference to the frame 1 and to thereby impart to the bearing sleeve 39 predetermined oscillatory movements in clockwise and counterclockwise directions. The configuration of the groove 50, the length of the lever 48 and the transmission ratio of the rack 46 and ring gear 45 are such that the extent of oscillatory movement of the pressing members 35 equals three times the distance between a pair of neigboring sealing members 5 (in the illustrated embodiment, the extent of clockwise or counterclockwise angular movement of the bearing sleeve 39 is 67.5 degrees). The cam 51 can serve to control the valve means which regulates the flow of gas into and from the cylinders 41.

The lower end portion of the drum-shaped carrier 4 is secured to or provided with a ring gear 55 which meshes with a pinion 56 mounted on a shaft 56a journalled in the frame 1. The lower end portion of the shaft 56a is connected with a gear 57 meshing wih a gear 58 on a second output shaft of the transmission 52. The ratio of the speeds of gear 58 and cam 51 is such that the r.p.m. of the cam 51 is twice the r.p.m. of the carrier 4. The configuration of the groove 50 in the cam 51 is such that, while the gear 58 causes the carrier 4 to rotate the sealing members 5 and the guide members 8 at a constant speed, the cam 51 causes the pressing members 35 to move in synchronism with and in the same direction as the sealing members 5 through a distance corresponding to twice the distance between a pair of neighboring sealing members 5, that the speed of the pressing members 35 is thereupon reduced to zero during an angular displacement of the bearing sleeve 39 which corresponds to one-half the distance between a pair of neighboring sealing members 5, and that the speed of the pressing members 35 is thereupon increased while the carrier 4 completes an angular movement through 90 degrees (i.e., a distance equalling four times the distance between a pair of neighboring sealing members 5). FIGS. 1 and 2 illustrate the platform 38 for the pressing members 35 in the two end positions with reference to the axis of the spindle 15 and column 2. During the third stage (while the carrier 4 rotates through 90 degrees, the bearing sleeve 39 rotates in the opposite direction through a distance equaling three times the distance between a pair of neighboring sealing members 5. During the fourth or last stage of a cycle, the speed of the bearing sleeve 39 is again increased to ultimately rotate the pressing members 35 in the same direction as and at the exact speed of the sealing members 5. During such last stage, the carrier 4 covers a distance corresponding to half the distance between a pair of neighboring sealing members 5. During each cycle, the sealing members 5 are angularly moved with reference to the pressing members 35 through an angle of exactly 180 degrees.

A web of synthetic plastic material which is to be converted into discrete open-ended bags is stored in the form of a roll 60 which is rotatable about a horizontal axis. The web is being withdrawn by a pair of advancing rolls 66, 67 so as to travel along an arcuate path starting at a deflecting roller 63 and extending around the majority of guide members 8. The web is folded to assume a V-shaped cross-sectional outline during travel along a preferably adjustable folding plow 61 and is thereupon caused to move between the folding rolls of a fork 62 which converts the web into the aforementioned blank 64 having two overlapping sections before the blank reaches the deflecting roller 63. The advancing rolls 66, 67 (at least one of which is driven) are located downstream of a second deflecting roller 65 and are followed by a pair of rotary knives 68, 69 having blades which cooperate to sever from the intermittently welded blank 64 discrete bags B by cutting the welded blank 64 centrally of the vertical seams which are formed by the sealing members 5 in cooperation with the pressing members 35. The pressing members 35 are moved radially inwardly toward the adjacent sealing members 5 during that stage of each cycle when the speed of the pressing members 35 equals the speed of the adjacent sealing members 5 and while such sealing and pressing members rotate in the same direction (namely, counterclockwise, as viewed in FIG. 1 or 2). Radially inwardly oriented movements of the pressing members 35 are brought about in response to admission of compressed gas into the outer chambers of cylinders 41 whereby the piston rods 40 are moved radially inwardly toward the bearing sleeve 39 with simultaneous stressing of the springs 43 (see FIG. 2).

The two layers of the blank 64 between each pressing member 35 and the adjacent sealing member 5 are bonded to each other in response to the application of heat and/or pressure so that the blank 64 is provided with equidistant vertically extending seams which are common to a pair of neighboring bags B prior to severing of such bags from the welded blank 64 by the blades of the knives 68, 69. The configuration of electrodes at the outer sides of the sealing members 5 determines the width and the shape of seams. The pressing members 35 are caused to move radially outwardly and to become disengaged from the blank 64 shortly before their angular speed decreases to below the angular speed of the sealing members 5. Such radially outwardly directed movements of the pressing members 35 are caused by springs 43 in response to opening of suitable valve means for evacuation of compressed gas from the outer chambers of the cylinders 41. During each revolution of the carrier 4, the pressing members 35 cooperate first with eight pressing members 5 and thereupon with the next-following eight pressing members 5 so as to insure that the blank 64 is converted into a succession of coherent bags B each of which is of identical width, as considered in the direction of travel of the blank 64. This will be readily understood by considering the aforedescribed movements of sealing members 5 and pressing members 35; the pressing members move forwardly through 67.5 degrees (in the direction of rotation of the sealing members 5) while the carrier 4 rotates through 90 degrees and rearwardly (again through 67.5 degrees) while the carrier 4 rotates through the next 90 degrees. Therefore, the pressing members 35 return to a starting position (FIG. 1) upon completion of each cycle and are thereupon ready to be accelerated and to cooperate with the adjacent second half of sealing members 5 during the next-following cycle. The apparatus produces sixteen bags B during each revolution of the carrier 4.

In order to insure that printed matter (or other indicia) which is applied to the web of plastic material on the roll 60 prior to conversion into discrete bags B is located at the same spot of each successively formed bag, the apparatus is preferably provided with a scanning device or detector 70 which is shown in FIG. 1 and serves to scan the blank 64 for the presence of printed matter. If the rate at which the detecter 70 (e.g., a customary photosensitive element and a light source which directs a beam of light against the blank 64 so that the light beam is reflected into the photosensitive element and the latter produces a signal whenever the beam is reflected on printed matter) detects the printed matter is not properly synchronized with movements of the pressing members 35, the detector produces a signal which starts the motor 23 in a clockwise or in a counterclockwise directon to thereby move the spindle 19 and the stop 18 up or down and to thus change the axial position of the cam 14 (and hence the axial position of the cam 12). This lengthens or shortens the path for the blank 64 between the deflecting rollers 63 and 65 (because the guide members 8 move radially outwardly or inwardly) and thereby results in appropriate adjustment of the positions of printed matter on successive bags B. The manner in which a photosensitive or other suitable detector can regulate the direction and the extent of angular movement of a reversible electric motor is well known in the art and forms no part of the present invention.

Figure 4:
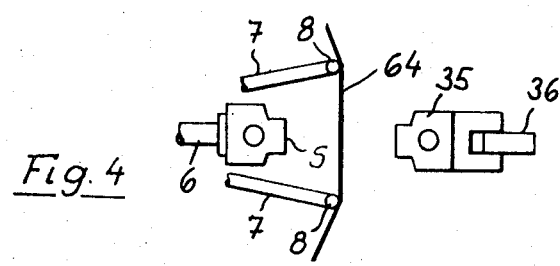
FIG. 4 is a plan view of a detail in the structure shown in FIG. 1 or 2 but illustrating one of the first sealing members in retracted position.

The sealing members 5 (and, if necessary, the pressing members 35) are heated either intermittently or continuously, depending on the nature of the material of the blank 64. These members can be heated by electric resistance heaters, by a circulating fluid or by any other suitable heating means, not shown. If the members 35 and/or 5 are heated continuously, the blank 64 is likely to become charred in response to a stoppage or slowdown of the apparatus, for example, during inspection or during threading of a fresh blank 64. Such charring is prevented by permitting compressed gas to escape from the lower chamber of the cylinder 30. The spring 24 is then free to expand and pushes the motion transmitting member 25 downwardly to lower the tube 3 and to thus lower the adjusting cam 12. The springs 9 are free to contract and move the sealing members 5 radially inwardly out of contact with the blank 64. The retracted position of one of the sealing members 5 is shown in FIG. 4.

Figure 5:
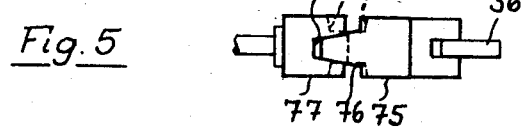
FIG. 5 is a similar plan view of a pair of cooperating first and second sealing members and of novel centering or aligning means for such sealing members.

If the pressing members are to move into accurate alignment with the adjacent sealing members during the formation of seams on the blank 64, these members may be provided with interengaging aligning or centering means in the form of wedge-like projections or teeth 76 and matching recesses or notches 78 as shown in FIG. 5. The illustrated pressing member 35' carries a plate 75 which is formed with the projection 76 and the illustrated pressing member 5' is provided with a plate 77 which is formed with the recess 78. The positions of the plates 75, 77 can be reversed and these plates can be provided with two or more matching projections and recesses. Such aligning or centering means are particularly desirable if the members 5' and 35' are to form relatively complicated seams of undulate, sawtooth-shaped or other configuration. The plates 75, 77 are preferably mounted at the upper ends of the respective members 35' and 5', i.e., adjacent to the path of the blank.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In an apparatus for the making of bags having overlapping layers consisting of bondable synthetic plastic material, a combination comprising first carrier means rotatable about a predetermined axis; a plurality of equidistant first sealing members mounted on said first carrier means for orbital movement about said axis; second carrier means mounted for angular movement about said axis; a plurality of second sealing members mounted on said second carrier means; means for advancing a blank having overlapping layers of bondable material along a predetermined path extending between said first and second sealing members; and means for moving said second sealing members toward the adjoining first sealing members to thereby compress the blank between cooperating first and second sealing members with attendant bonding of compressed portions of the layers to each other.

2. A combination as defined in claim 1, wherein said second sealing members are disposed along an arc having its center of curvature on said axis.

3. A combination as defined in claim 2, further comprising means for oscillating said second carrier means about said axis in and counter to the direction of rotation of said first carrier means through angles of predetermined magnitude.

4. A combination as defined in claim 1, wherein said second carrier means is provided with levers each of which supports a discrete second sealing member and each of which is pivotable with reference to said second carrier means to move the respective second sealing member toward the path of said first sealing members, said means for moving said second sealing members comprising intermittently operated fluid-actuated cylinder and piston means mounted on said second carrier means.

5. A combination as defined in claim 1, further comprising cooperating first and second aligning means respectively provided on said first and second sealing members to mate with each other when said sealing members are moved toward the adjoining first sealing members.

6. A combination as defined in claim 5, wherein said aligning means are adjacent to the path of movement of said blank.

7. A combination as defined in claim 1, wherein said first sealing members are adjustable radially of said first carrier means and further comprising adjusting means for moving said first sealing members with reference to said first carrier means.

8. A combination as defined in claim 7, further comprising blank-engaging guide members mounted on said first carrier means and alternating with said first sealing members, said adjusting means being arranged to move said first sealing members radially toward said axis to positions in which said first sealing members are remote from said path.

9. A combination as defined in claim 8, wherein said guide members are movable radially of said first carrier means and further comprising second adjusting means for moving said guide members with reference to said first carrier means.

10. A combination as defined in claim 9, wherein one of said adjusting means is arranged to move the respective members radially of said first carrier means in response to actuation of the other adjusting means.

11. A combination as defined in claim 1, further comprising blank-engaging guide members provided on said first carrier means and alternating with said first sealing members, said guide members being adjustable substantially radially of said first carrier means to thereby change the length of said path, adjusting means actuatable to move said guide members with reference to said first carrier means, and detector means arranged to scan indicia provided on said blank at equal intervals and to actuate said adjusting means in response to deviations of the rate of detection of indicia from a predetermined rate.

12. A combination as defined in claim 1, further comprising blank-engaging guide members provided on said first carrier means and alternating with said first sealing members, said guide members being movable substantially radially of said first carrier means to thereby change the length of said path, and adjusting means for moving said guide members with reference to said first carrier means, said adjusting means comprising conical cam means movable axially of said first carrier means and follower means provided on said guide members and tracking said cam means so as to move the respective guide members radially inwardly in response to movement of said cam means in one axial direction and to move the respective guide members radially outwardly in response to movement of said cam means in the other axial direction.

13. A combination as defined in claim 12, wherein said first sealing members are movable substantially radially of said first carrier means and further comprising second adjusting means for moving said first sealing members with reference to said first carrier means, said second adjusting means comprising second conical cam means movable axially of said first carrier means and follower means provided on said first sealing members and engaging said second cam means to respectively move the corresponding first sealing members radially inwardly and outwardly in response to movement of the second cam means in a first and second axial direction.

14. A combination as defined in claim 13, further comprising means for moving said first-mentioned and second cam means in synchronism in the axial direction of said first carrier means so that each radial adjustment of said guide members entails a predetermined adjustment of said first sealing members.

15. A combination as defined in claim 14, wherein said means for moving said cam means comprises a reversible motor, a feed screw rotatable by said motor, a nut meshing with said feed screw and provided on said first carrier means to effect axial movements of said feed screw in opposite directions in response to operation of said motor in opposite directions, and means for maintaining said cam means at a predetermined distance from said feed screw, said feed screw being coaxial with said first carrier means.

References Cited
UNITED STATES PATENTS

| | | | |
|---|---|---|---|
| 2,670,783 | 3/1954 | Moravec et al. | 156—583 |
| 2,732,887 | 1/1956 | Drew et al. | 156—582 |
| 3,192,095 | 6/1965 | Doyen et al. | 156—583 |
| 3,360,416 | 12/1967 | Cochrane | 156—583 |
| 3,616,042 | 10/1971 | Beyer et al. | 156—583 |

DOUGLAS J. DRUMMOND, Primary Examiner